(12) United States Patent
Zenari et al.

(10) Patent No.: US 6,322,292 B1
(45) Date of Patent: Nov. 27, 2001

(54) BACKFILLING UNDERGROUND VOIDS

(76) Inventors: Lloyd P. Zenari, P.O. Box 97, Beaconsfield NSW 2014 (AU); Patrick J. Stephens, 1276 Chuckanut Dr., Bellingham, WA (US) 98225

( * ) Notice: Subject to any disclaimer, the term of this patent is extended or adjusted under 35 U.S.C. 154(b) by 0 days.

(21) Appl. No.: 09/015,374

(22) Filed: Jan. 29, 1998

Related U.S. Application Data

(60) Provisional application No. 60/036,174, filed on Jan. 29, 1997.

(51) Int. Cl.[7] ................................................. C09K 17/10
(52) U.S. Cl. ............................. 405/267; 405/266; 299/11
(58) Field of Search ................................. 166/292, 299; 405/263, 266, 267; 299/11

(56) References Cited

U.S. PATENT DOCUMENTS

| | | | |
|---|---|---|---|
| 4,415,366 | * 11/1983 | Copening | 106/86 |
| 4,419,135 | * 12/1983 | Hoge | 106/678 |
| 4,466,833 | * 8/1984 | Spangle | 106/88 |
| 4,470,727 | * 9/1984 | Ritter | 405/267 |
| 5,494,514 | * 2/1996 | Goodson et al. | 106/677 |
| 5,663,123 | * 9/1997 | Goodhue, Jr. et al. | 507/225 |

FOREIGN PATENT DOCUMENTS

1337421 * 11/1973 (GB).

* cited by examiner

*Primary Examiner*—David Bagnell
*Assistant Examiner*—Sunil Singh
(74) *Attorney, Agent, or Firm*—Todd N. Hathaway

(57) ABSTRACT

A method for filling an underground void, such as a mine stope, without danger of causing mud slides therein, with the material being pumped from a site which is located remote from the void. A fluid, cementitious material is formed by mixing hydraulic cement, water, particulate solid material, and foam material. The bubble structure which results from incorporating the foam constituent in the fill material renders this much more fluid and pumpable, thereby allowing the use of much higher solids-to-water ratios than would otherwise be possible while still being able to pump the material over significant distances. This reduces the possibly of fluidic collapse of the material in the void, and produces other advantages as well. In the case of stopes, the particulate solid component is ordinarily provided using the tailings from the mine operation.

10 Claims, 1 Drawing Sheet

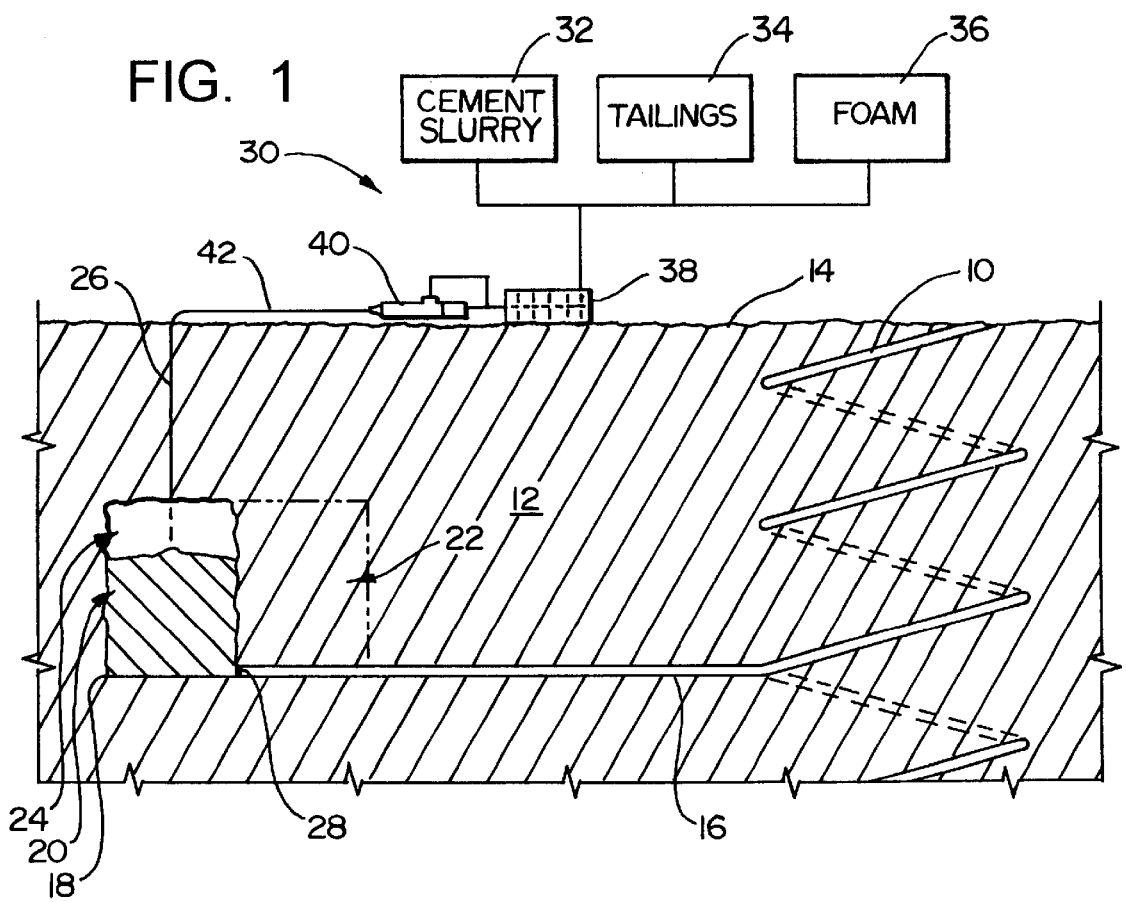

BACKFILLING UNDERGROUND VOIDS

This application claims the benefit of earlier filed U.S. provisional application No. 60/036,174 filed Jan. 29, 1997.

BACKGROUND (i) Field of the Invention

This invention relates generally to methods for backfilling undergrounds void in mining or similar applications, and, more particularly, to a method for filling stopes in underground ore mining operations.

(ii) Related Art

In many underground ore mining operations it is common to mine underground by forming a vertical lift shaft or helical tunnel and then to mine horizontally extending tunnels from the central axis at different levels. Large volumes of ore may then be removed via the horizontal tunnels by blasting a succession of stopes or underground voids upwardly from the far end of each tunnel progressively back toward the center axis. In order for safe mining to proceed it is necessary to backfill each underground void or stope formed as part of the blasting and ore evacuation procedure. This is necessary to support the "roof" above the stope and to allow an immediately adjoining volume of ore to be blasted in safety.

The mine backfilling is typically carried out by mixing a suitable particulate solid material, typically the mine tailings, with cement and water and conveying, trucking or pumping the backfill mixture to the location of the underground stope. Excess water draining from the backfill mixture must be pumped from the mine and the backfill mixture allowed to set to for a solid fill in the stope.

The cost of backfilling is significant and can be as much as 20% of the total cost of the mining operation. The cost of backfilling is directly related to the cost of the cement content in the filling mixture but a significant cost is also involved in transport of the material to the void. The most convenient way of transporting the material to the void is by pumping through pipes but this requires a significant water content in the backfill mixture. A conflicting requirement is that, in order to avoid mud slides underground (i.e., the fluidic collapse of part of the backfilled material) the recommended percentage of solids in the fill is above 74%. It is often difficult to pump such a mixture (at this ratio of solids) significant distances but any increase in water content to improve pumpability increases the risk of mud slides and increases the volume of cement required in the mix to reach specified strengths which are typically in the order of 1 MPa.

The amount of cement varies according to the backfill material and the water content but is usually around 6% in order for the fill to reach the required strength.

It is desirable to be able to provide a backfill material which is easy to pump and therefore economic to place without requiring high water content which increases the risk of mud slides or high cement content which increases the cost of the operation. Such filling material is also desirable for use in other mining situations such as the filling-in of disused mines to remove hazardous threats from cave-ins in subsequent open cast mining operations and other similar situations.

SUMMARY OF THE INVENTION

The present invention therefore provides a method of backfilling an underground void in mining or similar applications, said method comprising the steps of forming a fluid filling material by mixing particulate solid material with an aerated cement slurry, flowing the fluid filling material into the void and allowing it to set.

Preferably the aerated cement slurry comprises a mixture of cement and foam.

Preferably the foam is formed from water and frothing agents.

Preferably the particulate solid material comprises mine tailings.

Preferably the step of flowing the fluid filling material into the void includes pumping the filling material from the point of mixing to the void.

Preferably the void comprises a stope in a mine.

BRIEF DESCRIPTION OF THE DRAWINGS

FIG. 1 is a diagrammatic, cross-sectional, elevational view showing the backfilling of an exemplary mine stope in accordance with the present invention.

DETAILED DESCRIPTION

Notwithstanding any other forms that may fall within its scope, one preferred form of the invention will now be described by way of example only with reference to the accompanying drawing, which shows a typical underground mining operation in which the present invention may be used.

In a typical mining operation in which the present invention may be used, a vertical access, which may be for example a lift shaft or a helical tunnel 10 is mined into the earth 12 from the surface 14. At the required depth, or at various intervals, horizontal tunnels 16 extend outwardly from the axis shaft 10 to their remote ends 18. To mine a body of ore an area 20 above the end of the tunnel 18 is drilled and explosives placed and detonated to collapse the ore material within the area 20 so that it falls into the tunnel 16 and can be removed by well known mining techniques.

In order to proceed with the mining operation by next blasting and collapsing the adjacent area 22, it is first necessary to fill the empty void or stope 24 formed by the collapse and removal of material from the area 20.

This may be conveniently carried out by drilling a small access hole 26 from the surface 14 into the upper portions of the stope 24, and blocking the tunnel at the point 28 (where it enters the stope) in a suitable manner.

Backfilling material is then prepared according to the present invention by mixing a suitable particulate material, which is typically the mine tailings resulting from processing the ore removed from the mine, with an aerated cement slurry in a mixing apparatus 30. The aerated cement slurry is suitably formed by mixing portland cement with foam which is typically formed from water and suitable frothing agents.

As is shown schematically in FIG. 1, the apparatus preferably includes components for supplying the cement slurry 32, tailings or other particulate material 34, and foam 36 and feeding these into a mixer 38. The cement component may be any suitable hydraulic cement, including Portland cements, and the tailings or other solid material may be crushed if necessary to provide the particulate constituent. The foam component, in turn, may be provided by any suitable foam material or foaming agent, such as the various aqueous foam materials and chemical foaming agents which are known to those skilled in the relevant art. Aqueous foam materIals, which are generally preferred because of their economy, consistency, and ease of use, are typically formed by mixing a liquid foam concentrate material (suitable types of which are available from The Mearl Corporation, Roselle Park, N.J., amongst other suppliers) with water to form a foam solution, and then mixing the foam solution to form a finished foam having a fine, stable bubble structure (suitable foam generators of this type may be obtained from The Mearl Corporation and from Pacific International Grout Company, Bellingham, Wash.).

In some embodiments it may be desireable to configure the feed mechanisms so as to enable the operator to control the amounts and relative proportions of the constituents as these are being fed into the mixing apparatus; for example, the relative proportions of cement slurry and foam solution may be controlled using variable-speed metering pumps, and the tailing particulate may be fed from a hopper using a controllable speed conveyor or rotary metering valve.

It will be understood, however, that any suitable feed and mixing mechanisms may be used in carrying out the present invention, and the choice of mechanisms will depend to a significant degree on the form in which the fill constituents are supplied. For example, FIG. 1 shows mixer 38 as a horizontal paddle mixer, which may provide certain advantages where the cement is already in slurry form and the foam constituent is added as a finished aqueous foam. In other embodiments, however, the mixing of water and cement dust may be performed in the mixer itself, and the foam component may be supplied as a chemical frothing agent which is combined with water either in or before entering the mixer. Accordingly, a vertical tub mixer or other form of mixer may be preferred in some embodiments. Similarly, FIG. 1 shows the system as incorporating a large positive-displacement, progressive cavity, screw-type pump, of the type which are available under the trademark Moyno™ from Robbins & Meyers, Dayton Ohio, which has several advantages (including efficiency, precise control of the pumping rate, and avoiding damage to the bubble structure in the aerated fill material), but again it will be understood that any suitable type of pump may be employed in this role.

The resultant fluid filling material contains a large amount of entrained air byt virtue of the foam component. As can be seen in FIG. 1, this is flowed from the mixer 38 into the stope 24, e.g., by using the pump 40 and pipe 42.

It has been found that by using an aerated cement slurry (as opposed to a conventional cement-water slurry), the resultant bubble structure in the filling material renders this significantly more fluid and pumpable than a conventional mixture of cement, water and particulate solid material, and therefore relatively easy to pump over long distances using the pump 40 and pipe 42, even when the percentage of solids in the fill is kept above the minimum required to avoid the risk of mud slides in the stope 24.

The use of foam in the backfill mix not only increases the pumpability of the mix, reducing the amount of water required for efficient pumping, but also results in the following additional advantages:
1. A decrease in cement content to achieve the required strength of the set backfill material in the stope. Approximately 4.5 to 5% cement is now required compared with at least 6% when foam is not used.
2. An increase in the percentage of solids in the backfill material placed in the stope. Approximately 86–88% solids is achievable which decreases the probability of mud slides and decreases shrinkage during the drying process.
3. Less water needs to be pumped from the mine which gives an additional cost benefit.
4. There is an increase in the mix strength which is dependent upon cement quantities.

The overall volume of the mix to be placed in the stope is also increased by approximately 5–10% compared with mixtures without foam, the increase depending on the height of the void being filled. Increased height results in increased compression of the foam and therefore less overall volume gain.

The additional expense of the foam, both in the mixing process and in the frothing agents, is more than off-set by the decrease in cement quantities (by reducing the water content), improvements in pumpability, increase in overall volume, and increase in the percentage of solids in the mix. The backfilling operation according to the present method is therefore not only more economical but also results in a safer situation in the mining operation.

It is to be recognized that various alterations, modifications, and/or additions may be introduced into the constructions and arrangements of parts deescribed above without departing from the spirit or ambit of the present invention as defined by the appended claims.

What is claimed is:

1. A method for filling an underground mine void without causing mud slides in said void, with material pumped from a site which is located remote from said underground void, said method comprising the steps of forming a fluid, cementitious fill material by mixing:
hydraulic cement;
water;
milled mine tailings in an amount sufficient that said fill material has a solids content of 74% or greater, so as to prevent said fill material from undergoing fluidic collapse in said underground void before said fill material sets; and
stable bubble foam material in an amount sufficient to enable said fill material to be pumped over a predetermined distance from said remotely located site to said underground void; and pumping said cementitious fill material into said underground void so as to substantially fill said void.

2. The method of claim 1, further comprising the steps of:
allowing said cementitious fill material to set up in said underground void so that said fill material supports an underground formation adjacent said void; and
excavating said underground formation adjacent said void which is supported by said fill material therein.

3. The method of claim 2, wherein said void is a first mine stope and said excavating forms a second mine stope adjacent said first stope.

4. The method of claim 1, wherein the step of forming said fill material further comprises the step of:
mixing a frothing agent with water to form said foam material.

5. The method of claim 1, wherein the step of forming said fill material further comprises the step of:
mixing an aqueous foam solution and air to form said foam material.

6. The method of claim 1, wherein the step of forming said cementitious fill material further comprises the step of:
forming said fill material at said site which is located remote from said underground void.

7. The method of claim 1, wherein the step of forming said fill material further comprises the step of:
mixing said hydraulic cement, water, milled mine tailings and foam material in proportions which are selected so that said solids content of said cementitious fill material is in the range of 86% to 88% by weight.

8. The method of claim 7, wherein the step of forming said fill material further comprises the step of:

selecting said proportions so that said percentage of hydraulic cement in said fill material is in the range from about 4.5 to about 5% by weight.

9. The method of claim 1, wherein the step of forming said fill material further comprises the step of:

mixing said hydraulic cement, water, milled mine tailings in proportions which are selected so that a percentage of hydraulic cement in said fill material is less than 6% by weight.

10. A method for filling an underground mine void without causing mud slides in said void, with material pumped from a remote site which is located a predetermined distance from said underground void, said method comprising the steps of forming a fluid, cementitious fill material by mixing:
hydraulic cement slurry;
milled mine tailings in an amount sufficient that said fill material has a solids content of 74% by weight or greater, so as to prevent said fill material from undergoing fluidic collapse in said underground void before said fill material sets; and stable bubble foam material in an amount sufficient to enable said fill material to be pumped over said predetermined distance from said remotely located site to said underground void;

said cement slurry, milled mine tailings and foam material being mixed in proportions which are selected so that a percentage of solids in said cementitious fill material is in the range from about 86% to about 88% by weight, and so that a percentage of hydraulic cement in said fill material is in the range from about 4.5 to about 5% by weight; and pumping said cementitious fill material into said underground void so as to substantially fill said void.

* * * * *